Figures 1, 2:
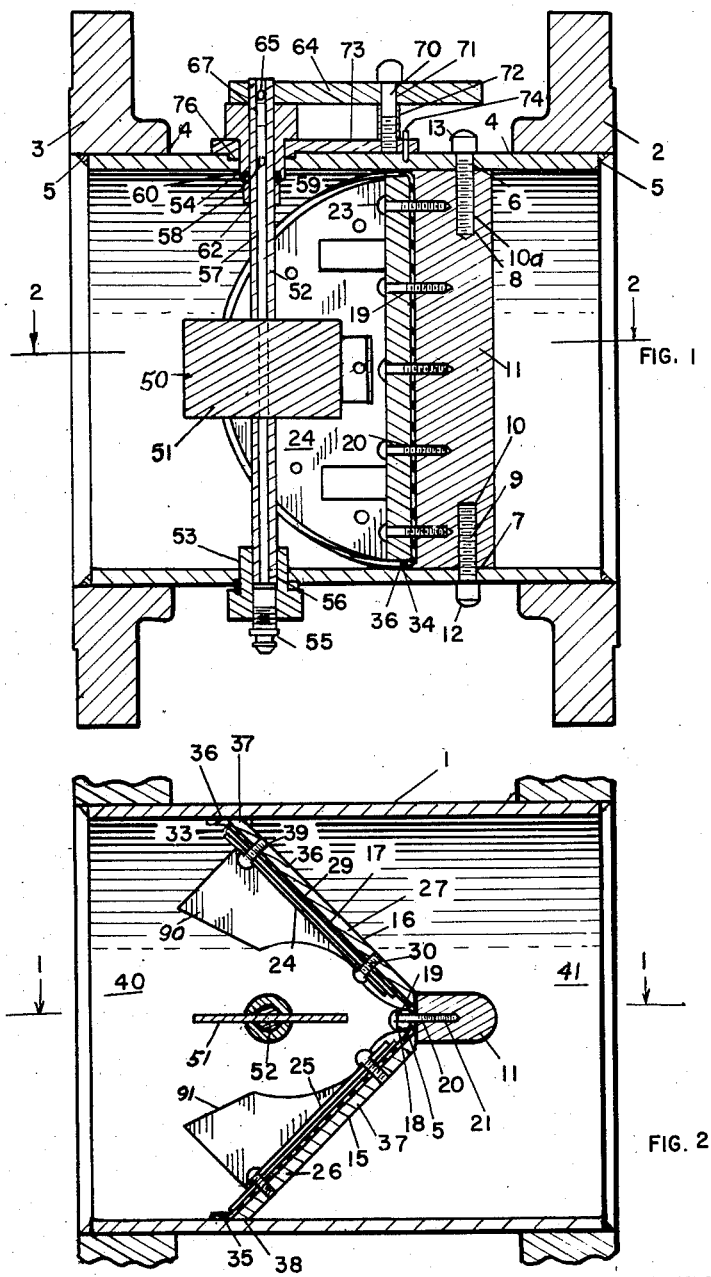

Aug. 4, 1959     E. M. SMITH     2,898,080
CHECK VALVE WITH OPERATOR THEREFOR

Filed July 28, 1954

INVENTOR.
EDWARD M. SMITH
BY
Charles L. Lavendesh
attorney

United States Patent Office 2,898,080
Patented Aug. 4, 1959

2,898,080

CHECK VALVE WITH OPERATOR THEREFOR

Edward M. Smith, Mansfield, Ohio, assignor to Techno Corporation, Erie, Pa., a corporation of Pennsylvania Application July 28, 1954, Serial No. 446,251

3 Claims. (Cl. 251—82)

This invention relates to check valves and more particularly to valves for use in pipe lines and conduits to allow fluid to flow in one direction and prevent the flow of fluid in the opposite direction. This is a continuation in part of S.N. 321,584, which issued as Patent No. 2,800,920 on July 30, 1957.

In valves of the general character which I disclose hereinafter, there has particularly been a problem in sealing the valve in engagement and at the point of contact of the valve with the inside of the valve body. In my prior patent application, I disclose valves which have various means of attaching the valve sealing members. Herein I disclose a particular means of sealing the valve to the pipe.

An object of my invention is to provide a check valve which will allow for a minimum of resistance to the flow of fluid or gas in one direction by which it completely stops the flow of fluid in the opposite direction and which provides a novel means of sealing between the actuated members of the valve and the inside of the valve.

Another object of the invention is to provide a valve having a novel sealing means.

Another object of my invention is to provide a valve which will be light in weight, simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 1 is a cross sectional view showing the novel valve taken on line 1—1 of Fig. 2; and Fig. 2 is a cross sectional view taken on line 2—2 of Fig. 1.

Now with more specific reference to the drawings, I show a valve body member 1 preferably cylindrical in cross section and having the flanges 2 and 3 attached to either end thereof preferably by welding at 4 and 5, respectively, and providing a convenient means for attatching the valve in a pipe line. The body 1 has bores 6 and 7 disposed diametrically opposite on the walls of the valve and through these bores extend the screw bolts 9 and 8 which threadably engage holes 10 and 10a in the hinge post 11. The bolts 9 and 8 have heads 12 and 13 disposed thereon which firmly engage the outer surface of the body member 1 for holding the hinge post 11 rigidly in position. The wings 15 and 16 are supported on the hinge post 11 by clamping the sealing member 17 thereto by means of the hinge clamp 18 which has holes 19 formed therein through which bolts 20 extend. The bolts 20 threadably engage holes 21 in the post 11. The heads 23 on the bolts 20 are clamped into tight engagement with the hinge clamp to hold it in tight engagement therewith. Therefore, the sealing member 17 forms the dual purpose of a sealing member and a hinge.

The side wings 15 and 16 are generally semi-elliptical in shape and are composed of the clamp plates 24 and 25 and the backing plates 26 and 27 which are held in contact with and sandwich the sealing member 17 between the clamp plates 24 and 25 and the backing plates 26 and 27 and are held together by means of the bolts 30 which extend through holes in the clamp plates 24 and 25 and threadably engage holes in the backing plates 26 and 27.

The sealing member 17 extends outward at 33 and 34 beyond the edges of the backing plates 26 and 27 and engages the inner surface of the valve body member 1 at 35 and 36 around the entire circumference of the inside of the body 1. The sealing member 17 also overlaps the juncture of the hinge post 11 and the inner surface of the cylindrical body on the upstream side of the hinge post 11 when flow is in the opposite direction. The edges of the backing plates 26 and 27 are preferably beveled at 37 and 38 to engage the inner periphery of the valve body 1 to form a firm backing for the downturned ends of the sealing member. Thus, it will be noted in Fig. 1 that the edge of the sealing member extends completely around the periphery of the valve member and forms sealing engagement with the inner periphery of the pipe adjacent the hinge so that fluid flowing through the valve from outlet 40 to inlet 41 impinges upon the edge to force it into sealing engagement with the inner periphery of the body 1.

The higher the pressure gets inside the pipe on the outlet 40 of the check valve, the tigher the edges 33 and 34 will be pressed into engagement with the inside of the valve body 1 and, therefore, the better the seal will be accomplished.

The operating mechanism is provided to close the valve against flow through the valve in a normal direction. I may operate my novel valve; that is, assist it in obtaining a closed position, by means of the operating member 50 which is made up of the plate 51 welded or otherwise attached to the transverse shaft 52. The transverse shaft 52 is journalled in the bearings 53 and 54 which are supported in the sides of the body 1 and a grease fitting 55 is provided in one end of the shaft 52 to supply lubricant to the bearings at 56 and to pass through the hollow 57 through the small hole 58. The novel valve bearings 53 and 54 are sealed against leakage by means of an O-ring 59 which is inserted in a groove 60 in the bearing 54 and is held against removal by the sleeve 62 atached to the shaft 52.

A handle 64 is provided on the other end of the shaft 52 which is fixed to the shaft 52 by means of a pin or bolt 65 extending through a hole in the handle and through a hole in the shaft. A block 67 prevents grease from escaping from the inside bore 57 of the shaft 52. A bolt 70 may extend through a hole 71 in the handle 64 and through a spacer 72 to engage the locking quadrant 73, the locking quadrant 73 being fixed to the valve body 1 by means of a pin 74 and a shoulder on bearing 54. It will be seen that the O-ring 59 is held in the groove 60 by means of the sleeve 62 which is held in abutment therewith by the handle 64 engaging the outer end of the bearing member 54.

During operation, when it is desired to close the valve when gas is flowing from outlet 40 to inlet 41, the valve will automatically close. When gas is flowing in the direction of inlet 41 to outlet 40 and it is desired to close the valve, I remove the bolt 70 and rotate the handle 64 which will rotate the plate-like operating member 50 to engage each of the cams 90 and 91 which are on the wings 15 and 16, moving the wings 15 and 16 into engagement with the inside periphery of the valve body 1.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. A check valve comprising a hollow cylindrical body, a hinge post extending diametrically of said body and attached thereto at the ends of said hinge post, a wing member on each side of said hinge post, said wing members comprising a sheet of resilient material attached at an intermediate point to said hinge post, said resilient material being generally elliptical in shape, the edges thereof being adapted to lie against the inside edge of said cylindrical body continuously around the inner periphery thereof, a hinge clamp, two opposite ends of said hinge clamp terminating in spaced relation to the inside periphery of said cylindrical body, means extending through said hinge clamp securing said resilient material to said hinge post, said wing members further comprising a backing plate and a clamp plate on each end of said resilient sheet with said resilient sheet sandwiched therebetween, said resilient material having a marginal edge protruding beyond the edges of said plate entirely around the edges thereof which are adapted to engage the inner periphery of said cylindrical body, one edge of each said wing member adapted to abut against an edge of said hinge post, said wing members being generally semi-elliptical in shape, said wing members swinging into generally parallel proximate relation when the flow of fluid through said cylindrical body is in one direction, said wing members swinging outwardly into engagement with the inner periphery of said cylindrical body and with said hinge post when the flow of fluid is in the opposite direction, said backing plates being disposed on the side of said resilient material toward the incoming fluid when the flow is in said one direction, the edges of said resilient sheet being adapted to be forced into sealing engagement with the entire inner periphery of said cylindrical body by the pressure of fluid forcing said wing members to closed position, said resilient sheet overlapping the juncture of said hinge post and the inner surface of said cylindrical body on the upstream side of said hinge post when flow is in said opposite direction, an operator member, said operator member comprising a shaft rotatably mounted in said body and extending generally parallel to said hinge post, cam means attached to said shaft, follower means on said wing members engagable by said cam means, and handle means on said shaft for rotating said cam means into engagement with said follower means for urging said wing members to closed position, said cam means being movable to a position out of engagement with said follower means whereby said wing members may be urged to parallel relation when fluid in said body flows in said one direction.

2. The valve recited in claim 1 wherein said follower means on said wing members comprises cam surfaces.

3. The valve recited in claim 2 wherein said handle means is attached to said shaft outside said hollow cylindrical body and means is provided for locking the distal end of said handle means to said cylindrical body to hold said wing members in position against the inner peripheral surface of said cylindrical body.

References Cited in the file of this patent

UNITED STATES PATENTS

| 430,689 | Rigg | June 24, 1890 |
| 461,206 | Goll | Oct. 13, 1891 |
| 1,187,245 | Bjerke | June 13, 1916 |
| 1,306,391 | Romanoff | June 10, 1919 |
| 1,910,949 | Germeyer | May 23, 1933 |
| 2,108,183 | Sjoberg | Feb. 15, 1938 |
| 2,307,546 | Shimer | Jan. 5, 1943 |
| 2,800,920 | Smith | July 30, 1957 |

FOREIGN PATENTS

| 50,950 | Austria | of 1911 |
| 366,253 | Great Britain | of 1932 |